(12) United States Patent
Agarwal

(10) Patent No.: US 8,813,031 B2
(45) Date of Patent: Aug. 19, 2014

(54) SYSTEM AND METHOD FOR AUTOMATICALLY RESOLVING DEPENDENCIES OF JAVA ARCHIVE FILES FOR USE WITH MAVEN

(75) Inventor: Vinay Agarwal, Bangalore (IN)

(73) Assignee: Oracle International Corporation, Redwood Shores, CA (US)

( * ) Notice: Subject to any disclaimer, the term of this patent is extended or adjusted under 35 U.S.C. 154(b) by 217 days.

(21) Appl. No.: 13/411,175

(22) Filed: Mar. 2, 2012

(65) Prior Publication Data

US 2013/0232469 A1 Sep. 5, 2013

(51) Int. Cl.
*G06F 9/44* (2006.01)
(52) U.S. Cl.
CPC ....................................... *G06F 8/71* (2013.01)
USPC .......................................................... 717/121
(58) Field of Classification Search
CPC ............................................................. G06F 8/71
USPC .......................................................... 717/121
See application file for complete search history.

(56) References Cited

U.S. PATENT DOCUMENTS

2010/0050156 A1* 2/2010 Bonanno et al. ............... 717/122
2010/0153920 A1* 6/2010 Bonnet ........................ 717/122

OTHER PUBLICATIONS

Dmytro Pishchukhin; "OSGi Tutorial: From project structure to release"; KnowHowLab.org website; Jun. 12, 2010.*
Shay Shmeltzer; "Using JDeveloper with Maven"; Oracle(R) Developer Blog website (oracle.com); Jul. 19, 2007.*

* cited by examiner

*Primary Examiner* — Qing Chen
*Assistant Examiner* — Clint A Thatcher
(74) *Attorney, Agent, or Firm* — Meyer IP Law Group

(57) ABSTRACT

A system and method is provided for automatically resolving dependencies of Java Archive (Jar) files, for use with software development tools such as Maven. A Maven coordinate determination logic is used to generate Maven coordinate information for, e.g., an Open Service Gateway Initiative (OSGi)-based Jar file. In accordance with an embodiment, an OSGi class loader is used to automatically determine Maven coordinates and dependency information based on the contents of the Jar, and store the coordinates and dependency information in a generated Project Object Model (POM) file.

15 Claims, 5 Drawing Sheets

```
<project xmlns="http://maven.apache.org/POM/4.0.0">
   <modelVersion>4.0.0</modelVersion>

// artifact coordinates
   <groupId>oracle.jdeveloper.group.sherman</groupId>  ⎫
   <artifactId>jar-to-pom-converter</artifactId>       ⎬ 104
   <version>1.0</version>                              ⎭

<dependencies>
      <dependency>
         <groupId>apache.maven.group</groupId>   ⎫
         <artifactId>core-maven</artifactId>     ⎬ 106
         <version>2.2.1</version>
         <scope>compile</scope>
      </dependency>
   </dependencies>

</project>
```

| # | Jar File Name | Contains POM | INPUT (Jar File) Manifest File Contents | OUTPUT (Maven Coordinates) GroupId | ArtifactId | Version | Dependencies |
|---|---|---|---|---|---|---|---|
| 1 | input_jar.jar | YES | NONE | | POM file contained in input_jar.jar | | |
| 2 | input_jar.jar | NO | NONE | oracle.jdeveloper | input_jar | jdeveloper's IDE version | NONE |
| 3 | input_jar.jar | NO | Bundle-SymbolicName=oracle.custom.maven<br>Bundle-Version=11.1.2.0.0<br>Bundle-ClassPath=" /dependent1.jar" | oracle.custom | maven | 11.1.2.0.0 | Maven Coordinates of dependent1.jar |
| 4 | oracle.custom.maven.jar | NO | Implementation-Version=11.1.2.0.0<br>Class-Path=" /dependent2.jar"<br>" /dependent2.jar" | oracle.custom | maven | 11.1.2.0.0 | Maven Coordinates of dependent2.jar |
| 5 | input_jar.jar | NO | Specification-Version=11.1.2.0.0 | oracle.jdeveloper | input_jar | 11.1.2.0.0 | NONE |
| 6 | input_jar_11.1.2.0.0 | NO | NONE | oracle.jdeveloper | input_jar | 11.1.2.0.0 | NONE |
| 7 | input_jar.jar | NO | Bundle-SymbolicName=oracle.custom.maven<br>Bundle-Version=11.1.2.0.0<br>Require-Bundle=oracle.custom.ant | oracle.custom | maven | 11.1.2.0.0 | Maven Coordinates on OSGi bundle identified by id oracle.custom.ant |

SYSTEM AND METHOD FOR AUTOMATICALLY RESOLVING DEPENDENCIES OF JAVA ARCHIVE FILES FOR USE WITH MAVEN

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

The invention is generally related to software development, including the use of Java, Maven, and OSGi, and is particularly related to a system and method for automatically resolving dependencies of Java Archive files, for use with software development tools such as Maven.

BACKGROUND

Maven is a software project management tool widely used by software developers to manage software projects, and in particular to centrally archive, within a Maven repository, those artifacts/binaries that comprise a project, and to then use the artifacts from virtually any system.

Generally, each artifact is identified with Maven coordinates that are a unique combination of an Artifact Id, Group Id, Version, and Type. A project's attributes are stored in a Maven Project Object Model (POM) file. The artifacts required to manage a project can be downloaded from a remote repository, and dumped into a user-specific local repository. Maven then picks up these artifacts from the local repository whenever it needs them.

A challenge arises when existing non-Maven projects must be converted to Maven artifacts. Often, such projects utilize a Java Archive (Jar) file as a reusable binary. Maven provides an install-file goal to deploy a Jar file into the Maven repository as a Maven artifact, but with severe limitations. For example, the goal requires passing the Maven coordinates manually to the install-file command; and also ignores any dependencies included in the Jar file. Instead, the goal only creates a default empty POM file with the coordinates.

Dependencies can be manually deployed to a repository after reading their location from a manifest file. However, it is difficult to resolve dependencies that are based on the Open Service Gateway Initiative (OSGi), a module system and service platform for the Java programming language that implements a complete and dynamic component model. Since the location of a dependent Jar is not directly available in the manifest file, only an OSGi class loader understands the OSGi based dependencies of the Jar. An OSGi based-Jar is defined with a unique OSGi identification, and not with its location. However, a Maven POM file without dependencies cannot be used for building a project. This is the general area that embodiments of the invention are intended to address.

SUMMARY

In accordance with an embodiment, a system and method is provided for automatically resolving dependencies of Java Archive (Jar) files, for use with software development tools such as Maven. A Maven coordinate determination logic is used to generate Maven coordinate information for, e.g., an Open Service Gateway Initiative (OSGi)-based Jar file. In accordance with an embodiment, an OSGi class loader is used to automatically determine Maven coordinates and dependency information based on the contents of the Jar, and store the coordinates and dependency information in a generated Project Object Model (POM) file.

BRIEF DESCRIPTION OF THE FIGURES

FIG. 1 shows an illustration of a typical Maven POM file.

FIG. 5 shows an illustration of output Maven coordinates for examples of Jar inputs, in accordance with an embodiment.

DETAILED DESCRIPTION

As described above, Maven is widely used by software developers to manage software projects, including archiving, within a Maven repository, those artifacts/binaries that comprise a project so that they can be used from virtually any system. Generally, each artifact is identified with Maven coordinates that are a unique combination of an Artifact Id, Group Id, Version, and Type. A project's attributes are stored in a Maven Project Object Model (POM) file. However, when existing non-Maven projects are to be converted to Maven artifacts, it is difficult to resolve dependencies, particularly those based on the Open Service Gateway Initiative (OSGi), since the location of a dependent Java Archive (Jar) file is not directly available in its manifest file.

In accordance with an embodiment, a system and method is provided for automatically resolving dependencies of Jar files, for use with software development tools such as Maven. A Maven coordinate determination logic is used to generate Maven coordinate information for, e.g., an OSGi-based Jar file. In accordance with an embodiment, an OSGi class loader is used to automatically determine Maven coordinates and dependency information based on the contents of the Jar, and store the coordinates and dependency information in a generated POM file.

FIG. 1 shows an illustration of a typical Maven POM file 102, as might be used in accordance with various embodiments. In Maven terminology a Jar file is referred to as an Artifact; and in turn each Artifact is identified by Maven coordinates that are a unique combination of Artifact Id, Group Id, and Version. For example, as shown in FIG. 1 the project therein includes Maven coordinates 104 that include a Group Id of "oracle.jdeveloper.group.sherman"; an Artifact Id of "jar-to-pom-convertor"; and a Version of "1.0". Each of these coordinates are stored in the Maven Project Object Model (POM) file, together with any dependencies 106 that are required to manage the project.

Figure 2:
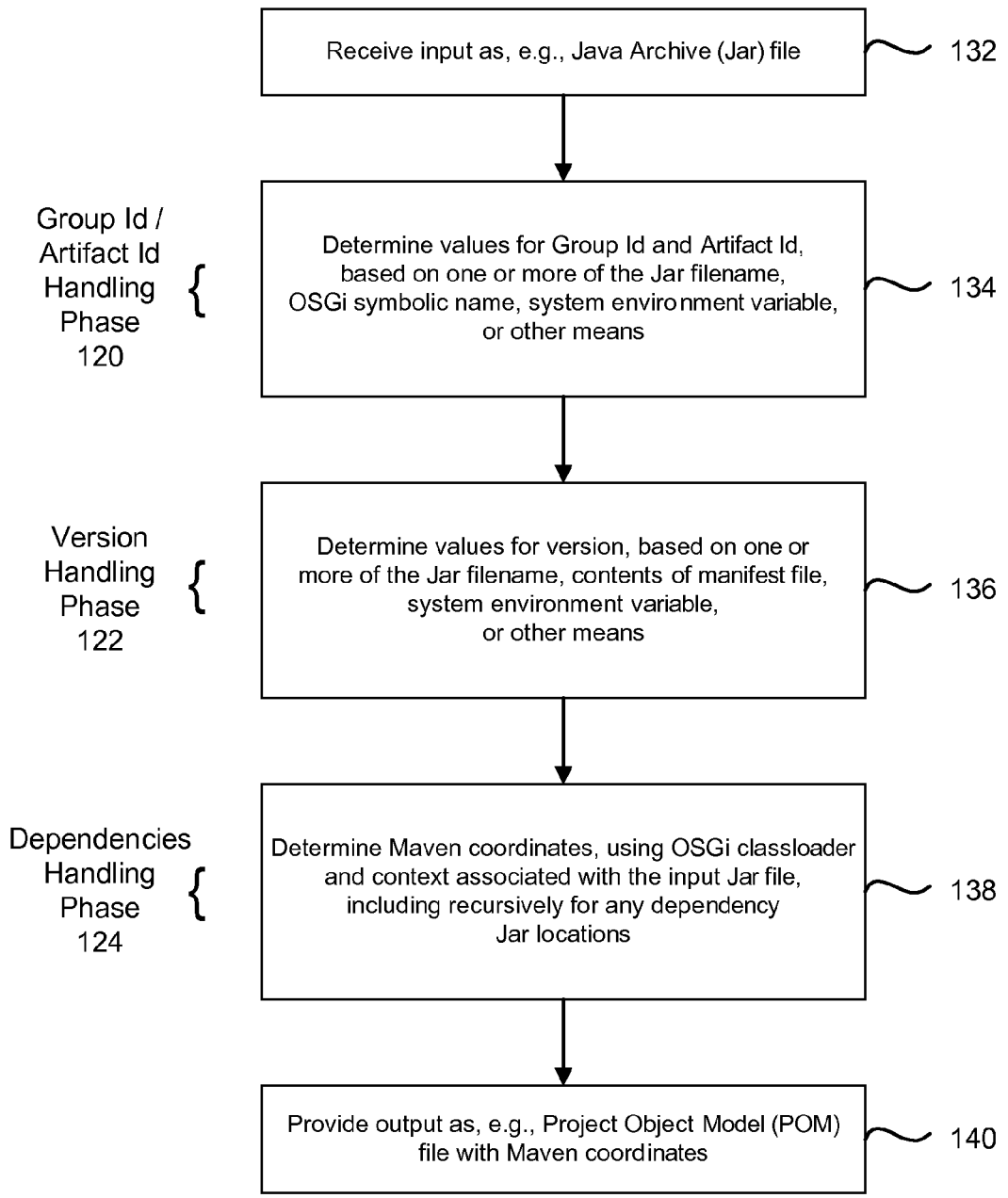
FIG. 2 shows a flowchart of a method or process for automatically resolving dependencies of, e.g., Jar files, for use with Maven, in accordance with an embodiment.

FIG. 2 shows a flowchart of a method or process for automatically resolving dependencies of, e.g., Jar files, for use with Maven, in accordance with an embodiment. As shown in FIG. 2, at a high-level the process proceeds in phases, including a Group Id/Artifact Id handling phase 120; a Version handling phase 122; and a Dependencies handling phase 124.

For example, in accordance with an embodiment, the system receives an input, e.g., a Jar file, 132. During the Group Id/Artifact Id handling phase, values for Group Id and Artifact Id can be determined 134, based on one more of the Jar filename, an OSGi symbolic name, a system environment variable, or other means. During the Version handling phase, a value for Version can then be determined 136, based on one or more of the Jar filename, the contents of the manifest file, a system environment variable, or other means. During the Dependencies handling phase, the Maven coordinates can then be determined, including recursively for any dependency Jar locations 138, using, e.g., an OSGi classloader to provide a context associated with the input Jar file. Finally, the output is provided 140, e.g., as a Maven POM file that includes the Maven coordinates, which can be stored in a Maven repository, and subsequently use in developing software projects.

Generally, the above approach can be used to generate Group Id, Artifact Id, Version, and Dependencies attributes for a particular input Jar file. Depending on the particular embodiment, the process can utilize a variety of different approaches, so that Maven coordinates for a variety different types of Jar files can be determined, such as, for example: Jars already containing a POM file; OSGi compliant Jar files which include manifest entries like Bundle-Classpath and Require-Bundle; and other types of Jar files. Examples of these different approaches are further described below with regard to FIG. 4.

Figure 3:
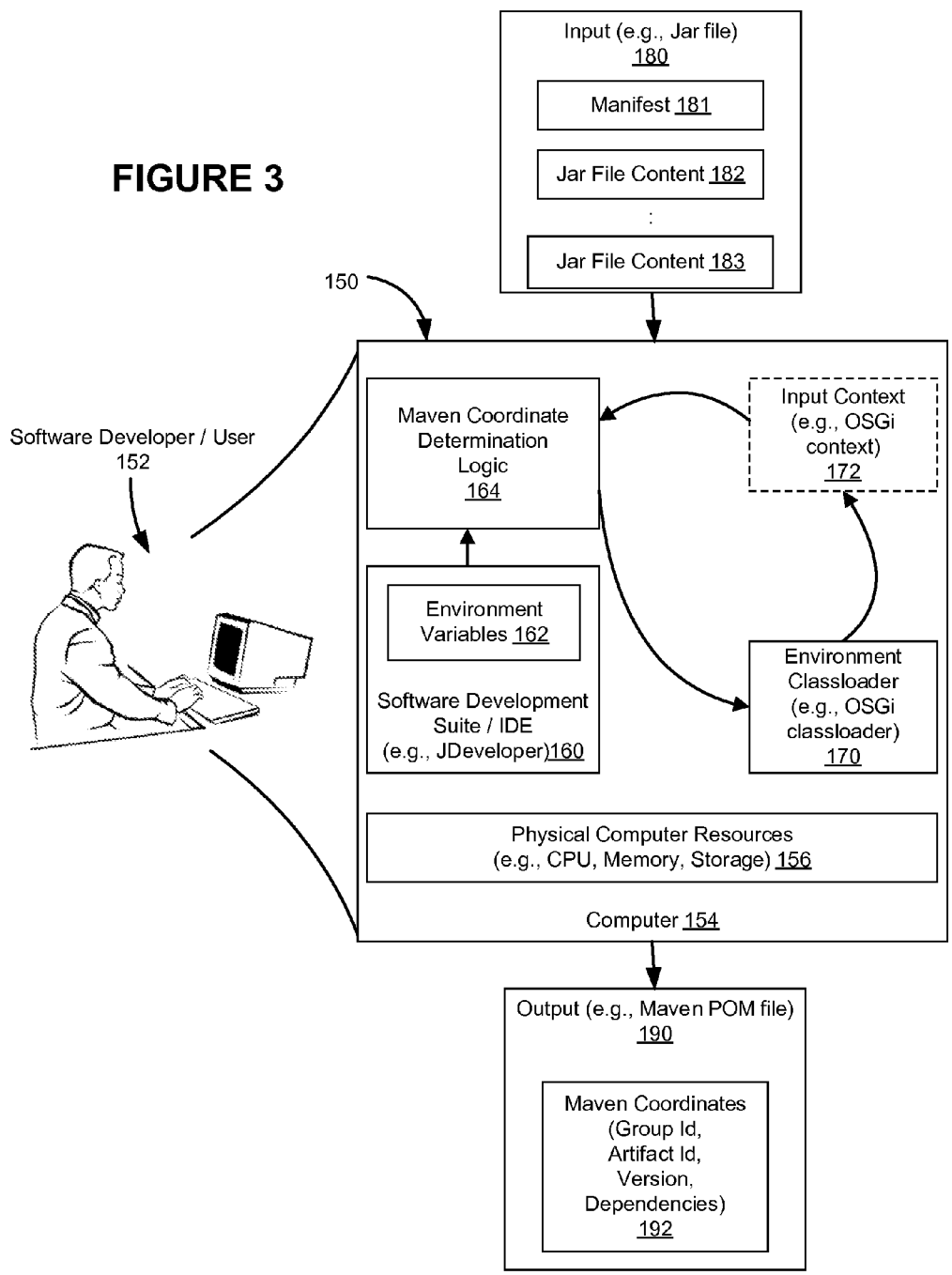
FIG. 3 shows an illustration of a system for automatically resolving dependencies of, e.g., Jar files, for use with Maven, in accordance with an embodiment.

FIG. 3 shows an illustration of a system 150 for automatically resolving dependencies of, e.g., Jar files, for use with Maven, in accordance with an embodiment. As shown in FIG. 3, the system includes a computer 154, which includes physical computer resources 156 (e.g., one or more processors or CPU, computer memory, or computer readable storage media). A software developer/user 152 can use the computer to develop software projects, typically using a software development suite or integrated development environment (IDE) 160, such as that provided by Oracle JDeveloper, or another IDE. An input e.g., a Jar file 180 includes file content 182, 183, and optionally a Jar manifest or manifest file 181. In accordance with an embodiment, the system uses a Maven coordinate determination logic, which can be included either within, or separate from, the software development suite or IDE itself. The Maven coordinate determination coordinate logic reads the information from the input and, in combination with an environment classloader 170 such as an OSGi classloader, and optionally any system environment variables 162, determines an appropriate context 172 (e.g., an OSGi context) for the input, and from that determines an output 190, including maven coordinates 192, such as the Group Id, Artifact Id, Version, and Dependencies, which can be written to a Maven POM file for use in developing software applications. In the context of JDeveloper, the OSGi classloader can be JDeveloper's built-in OSGi classloader.

Figure 4:
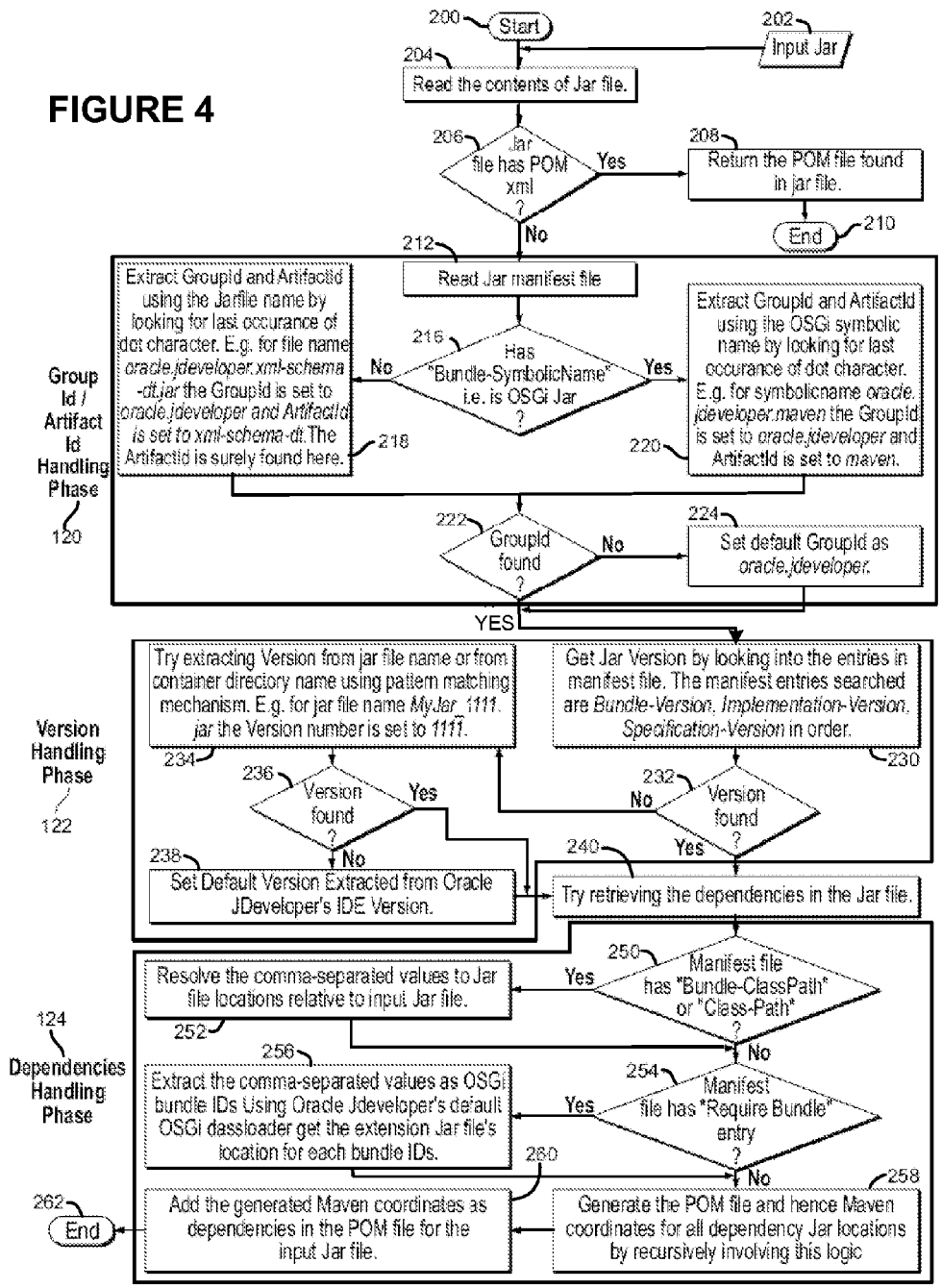
FIG. 4 shows another flowchart of a method or process in accordance with an embodiment.

FIG. 4 shows another flowchart of a method or process in accordance with an embodiment. As described above, at a high-level the process proceeds in phases, including a Group Id/Artifact Id handling phase; Version handling phase; and Dependencies handling phase. It will be evident that, although FIG. 4 illustrates a particular embodiment or implementation, in accordance with other embodiments different steps and/or arrangements to steps can be used, to suit the needs of a particular embodiment or environment.

As shown in FIG. 4, at step 200, the process starts. At step 202, an input Jar file is received and, at step 204, the contents of the Jar file are read. At step 206, if the Jar file includes a POM.xml file, then at step 208, the POM file is returned, and at step 210 the process ends.

If the Jar file does not include a POM, the Group Id/Artifact Id handling phase then begins. At step 212, the process reads the Jar manifest file. At step 216, the process determines whether the Jar is an OSGi Jar, and if so, at step 220, determines values for Group Id and Artifact Id using the OSGi symbolic name. Alternatively, at step 218, the process determines values for Group Id and Artifact Id using the Jar file name. If neither of the above approaches provides a Group Id then, at steps 222, 224, a default Group Id Is determined based on a system environment variable, such as, in the context of JDeveloper a Group Id of "oracle.jdeveloper".

The Version handling phase then begins. At step 230, the process attempts to determine a Jar version based first on the contents of the manifest file, and, if not successful 232, then by extracting a version from the Jar file name 234, and again if not successful 236, based on a system environment variable, such as, in the context of JDeveloper based on the JDeveloper IDE version 238.

The Dependencies handling phase then begins, at step 240. At step 250, if the manifest file includes a class path information then, at step 252, the system resolves comma-separated values to Jar file locations relative to the input Jar file. Alternatively, at step 254, if the manifest file includes a bundle information, then at step 256, the comma-separate values are extracted as OSGi bundle Id, and an OSGi classloader (e.g., in the context of JDeveloper, JDeveloper's built-in OSGi classloader) is employed to determine the extension Jar file's location for each Bundle Id. At step 258, the above steps are recursively used to produce Maven coordinate information for any dependency Jar locations, and, at step 260, to add the coordinate to a POM file corresponding to the input Jar file. At step 262, the process ends.

FIG. 5 shows an illustration 280 of output Maven coordinates 284 for various examples of Jar inputs 282, in accordance with an embodiment. For example:

An input (286), which includes an Input_Jar.jar which contains a POM, and does not include any manifest file contents, will result in the system determining the Maven coordinates based on the POM in the Input_Jar.jar;

An input (288), which includes an Input_Jar.jar which does not contain a POM, and does not include any manifest file contents, will result in the system determining a Maven Group Id of "oracle.jdeveloper", an Artifact Id of "Input_Jar", and a Version based on the JDeveloper IDE version, and no dependencies.

FIG. 5 further illustrates additional examples of AR inputs, and their corresponding output Maven coordinates. It will be evident that the examples illustrated in FIG. 5 are provided to illustrate various types of input and output, that in accordance with various embodiments or environments alternate examples can be provided, and that the functionality of the invention is not limited to the particular examples illustrated.

The present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a non-transitory storage medium or computer readable medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A system for automatically resolving software dependencies in an input Java Archive (Jar) file wherein the input Jar file is based on the Open Service Gateway Initiative (OSGi) and has one or more OSGi Jar file dependencies, for use with a software development tool, comprising:
    a computer which includes a processor;
    an integrated development environment (IDE) that is used by a user to develop software projects, wherein the IDE comprises an OSGi-based classloader and Maven coordinate determination logic;
    wherein the IDE is configured to use the Maven coordinate determination logic and the OSGi-based classloader to,
        automatically determine an appropriate context for the input Jar file,
        automatically determine, from the input Jar file, location information for the one or more OSGi Jar file dependencies,
        automatically determine, from the location information for the one or more OSGi Jar file dependencies, Maven coordinates corresponding to the one or more OSGi Jar dependencies of the input Jar file; and
        automatically generate a Maven Project Object Model (POM) file using the Maven Coordinates and the context, for subsequent use in developing the software projects.

2. The system of claim 1, wherein the OSGi classloader is configured to be used recursively to automatically determine, from the location information for the one or more OSGi Jar file dependencies, Maven coordinates corresponding to the one or more OSGi Jar dependencies of the input Jar file.

3. The system of claim 2,
    if the manifest file includes a class path information then the Maven coordinate determination logic is configured to extract Jar file locations relative to the input Jar file; and
    if the manifest file includes bundle information, then the Maven coordinate determination logic is configured to extract OSGi bundle Id, and the OSGi-based classloader is used to determine Jar file location for each OSGi bundle Id.

4. The system of claim 1, wherein the Maven coordinate determination logic is configured to determine values for a Group ID and Artifact ID based on a filename of the input Jar file.

5. The system of claim 1, wherein the IDE is a JDeveloper IDE, and JDeveloper IDE attributes are used in combination with the input Jar File to determine the appropriate context for the input Jar file and generate the Maven Project Object Model (POM) file.

6. A method of automatically resolving software dependencies in a software archive file, for use with a software development tool, comprising the steps of:
    providing an integrated development environment (IDE) that is used by a user to develop software projects, wherein the IDE comprises an OSGi-based classloader and Maven coordinate determination logic;
    receiving an input Java Archive (Jar) file wherein the Jar file is based on the Open Service Gateway Initiative (OSGi) and has one or more OSGi Jar file dependencies; and
    using the Maven coordinate determination logic and the OSGi-based classloader to
        automatically determine an appropriate context for the input Jar file,
        automatically determine, from the input Jar file, location information for the one or more OSGi Jar file dependencies,
        automatically determine, from the location information for the one or more OSGi Jar file dependencies, Maven coordinates corresponding to the one or more OSGi Jar dependencies of the input Jar file; and
        automatically generate a Maven Project Object Model (POM) file using the Maven Coordinates and the context, for subsequent use in developing the software projects.

7. The method of claim 6, wherein the OSGi classloader is used recursively to automatically determine, from the location information for the one or more OSGi Jar file dependencies, Maven coordinates corresponding to the one or more OSGi Jar dependencies of the input Jar file.

8. The method of claim 6, wherein the Jar file comprises a manifest file and wherein:
    if the manifest file includes a class path information then the Maven coordinate determination logic extracts Jar file locations relative to the input Jar file; and
    if the manifest file includes bundle information, then the Maven coordinate determination logic extracts OSGi bundle Id, and the OSGi-based classloader is used to determine Jar file location for each OSGi bundle Id.

9. The method of claim 6, further comprising:
    determining values for a Group ID and Artifact ID based on a filename of the input Jar file.

10. The method of claim 6, wherein the IDE is a JDeveloper IDE, and the method comprises using JDeveloper IDE attributes in combination with the input Jar File to determine the appropriate context for the input Jar file and generate the Maven Project Object Model (POM) file.

11. A non-transitory computer readable medium, including instructions stored thereon which when read and executed by one or more computers cause the one or more computers to perform the steps comprising:
    providing an integrated development environment (IDE) that is used by a user to develop software projects, wherein the IDE comprises an OSGi-based classloader and Maven coordinate determination logic;
    receiving an input Java Archive (Jar) file wherein the Jar file is based on the Open Service Gateway Initiative (OSGi) and has one or more OSGi Jar file dependencies; and
    using the Maven coordinate determination logic and the OSGi-based classloader to
        automatically determine an appropriate context for the input Jar file, automatically determine, from the input Jar file, location information for the one or more OSGi Jar file dependencies, automatically determine, from the location information for the one or more OSGi Jar file dependencies, Maven coordinates corresponding to the one or more OSGi Jar dependencies of the input Jar file; and automatically generate a Maven Project Object Model (POM) file using the Maven Coordinates and the context, for subsequent use in developing the software projects.

12. The non-transitory computer readable medium of claim 11, wherein the OSGi classloader is used recursively to automatically determine, from the location information for the one or more OSGi Jar file dependencies, Maven coordinates corresponding to the one or more OSGi Jar dependencies of the input Jar file.

13. The non-transitory computer readable medium of claim 11, wherein the Jar file comprises a manifest file and wherein:

if the manifest file includes a class path information then the Maven coordinate determination logic extracts Jar file locations relative to the input Jar file; and if the manifest file includes bundle information, then the Maven coordinate determination logic extracts OSGi bundle Id, and the OSGi-based classloader is used to determine Jar file location for each OSGi bundle Id.

14. The non-transitory computer readable medium of claim 11, including further instructions stored thereon which when read and executed by one or more computers cause the one or more computers to perform further steps comprising determining values for a Group ID and Artifact ID bases on filename of the input Jar file.

15. The non-transitory computer readable medium of claim 11, wherein the IDE is a JDeveloper IDE, and the method comprises using JDeveloper IDE attributes in combination with the input Jar File to determine the appropriate context for the input Jar file and generate the Maven Project Object Model (POM) file.

* * * * *

UNITED STATES PATENT AND TRADEMARK OFFICE
CERTIFICATE OF CORRECTION

| | |
|---|---|
| PATENT NO. | : 8,813,031 B2 |
| APPLICATION NO. | : 13/411175 |
| DATED | : August 19, 2014 |
| INVENTOR(S) | : Agarwal |

It is certified that error appears in the above-identified patent and that said Letters Patent is hereby corrected as shown below:

In the Drawings

On sheet 1 of 5, in figure 1, under Reference Numeral 102, line 5, delete "artifa ctId" and insert -- artifactId --, therefor.

On sheet 1 of 5, in figure 1, under Reference Numeral 102, line 10, delete "artifac tId" and insert -- artifactId --, therefor.

In the Specification

In column 4, line 9, delete "Is" and insert -- is --, therefor.

Signed and Sealed this
Third Day of March, 2015

Michelle K. Lee
*Deputy Director of the United States Patent and Trademark Office*